(12) United States Patent
Liu

(10) Patent No.: US 7,210,822 B2
(45) Date of Patent: May 1, 2007

(54) COMBINATION STRUCTURE FOR HOLLOW INTEGRATION ROD

(75) Inventor: Chin-Ku Liu, Chu-Nan (TW)

(73) Assignee: Coretronic Corporation (TW)

( * ) Notice: Subject to any disclaimer, the term of this patent is extended or adjusted under 35 U.S.C. 154(b) by 129 days.

(21) Appl. No.: 11/091,440

(22) Filed: Mar. 29, 2005

(65) Prior Publication Data
US 2005/0213333 A1    Sep. 29, 2005

(30) Foreign Application Priority Data
Mar. 29, 2004  (TW)  ............... 93108585 A

(51) Int. Cl.
*F21V 7/05*  (2006.01)
*G02B 5/09*  (2006.01)
*G02B 6/00*  (2006.01)

(52) U.S. Cl. ............ 362/297; 362/301; 362/346; 362/551; 359/855; 385/133

(58) Field of Classification Search ............ 362/297, 362/301, 346; 359/853, 855, 856, 857; 385/125, 385/133
See application file for complete search history.

(56) References Cited

U.S. PATENT DOCUMENTS

| 3,670,157 | A   | * | 6/1972  | Bragg ............... 362/346 |
| 6,254,241 | B1  | * | 7/2001  | Unger et al. ......... 359/855 |
| 6,464,378 | B1  | * | 10/2002 | Reed et al. .......... 362/297 |
| 6,625,380 | B2  |   | 9/2003  | Wagner ............... 385/146 |
| 6,771,870 | B2  | * | 8/2004  | Strobl et al. ........ 385/133 |
| 2002/0110327 | A1 |  | 8/2002  | Schmidt et al. ....... 385/46  |
| 2004/0001251 | A1 |  | 1/2004  | Huang ................ 359/368 |

FOREIGN PATENT DOCUMENTS

TW    523120 Y    3/2003

* cited by examiner

*Primary Examiner*—Alan Cariaso
(74) *Attorney, Agent, or Firm*—MH2 Technology Law Group

(57) ABSTRACT

The present invention is a combination structure for a hollow integration rod, wherein each reflective plate of the hollow integration rod has at least one convexity and at least one concavity. As the hollow integration rod is assembled, each two adjacent reflective plates are wedged by the corresponding convexity and concavity. At last, the structure of the hollow integration rod is fixed by a fixing component.

2 Claims, 8 Drawing Sheets

COMBINATION STRUCTURE FOR HOLLOW INTEGRATION ROD

DESCRIPTION OF THE INVENTION

1. Field of the Invention

The present invention relates to a combination structure for a hollow integration rod, and more particularly, to the combination structure for a hollow integration rod in a projection device.

2. Background of the Invention

In a projection device (not shown in the figures), the integration rod is an important optical component for uniforming an incident light (not shown in the figures) entering into the integration rod, in order to make the projection device to project an image with uniform brightness.

Please refer to FIG. 1. The conventional integration rod 10 is a hollow rectangular structure, the hollow inside thereof forms a light tunnel 12. When an incident light enters the light tunnel 12, it is reflected a plurality of times and then exits the light tunnel 12 for achieving the above object of uniform brightness.

The conventional integration rod 10 is assembled with four flat glass plates 14, and each joint of the flat glass plates 14 is fixed with glue 16 for making the integration rod 10 a hollow three-dimensional structure. However, each joint of the flat glass plates 14 is not designed to be a structure that one flat glass plate is wedged with another. Thus, the conventional integration rod 10 cannot bear the force upon it and is easy to collapse or deform. In addition, the incident light keeps projecting on the inner surface of the conventional integration rod 10 and thereby heat is accumulated such that the glue 16 is affected by the heat and deteriorates, and then the structure of the conventional integration rod 10 collapses. For preventing such situation, temperature is controlled carefully while in use. However, when the projected image needs to be brighter and clearer, the projection device needs a lamp (not shown in the figures) with higher power for being the light source of the incident light, and this causes the temperature of the incident light rises and thereby the temperature of the conventional integration rod 10 is so high that the glue 16 melts. As a result, the combination structure of each joint of the flat glass plates 14 needs to be improved.

SUMMARY OF THE INVENTION

The object of the present invention is to provide a combination structure for a hollow integration rod in order to solve the above problems in the prior art.

The present invention is a combination structure for a hollow integration rod, wherein each reflective plate of the hollow integration rod has at least one convexity and at least one concavity. As the hollow integration rod is assembled, each two adjacent reflective plates are wedged by the corresponding convexity and concavity. At last, the structure of the hollow integration rod is fixed by a fixing component. Therefore, when the hollow integration rod is used at a high temperature, the structure that each reflective plate wedges another can support the hollow integration rod in order not to collapse.

Besides, each convexity is rectangular and therefore easy to produce without increasing too much cost.

The hollow integration rod is composed of a plurality of reflective plates connecting one another for forming a light tunnel. The plurality of reflective plates includes a first reflective plate and a second reflective plate. The first reflective plate includes a first base and at least one first convexity. The first base includes a first lateral side and the first lateral side includes at least one first convexity extension. Each first convexity is extended from each corresponding first convexity extension. The length of each first convexity extension is shorter than the first lateral side, wherein the first lateral side except at least one first convexity extension forms at least one first segment. At least one first concavity is formed next to each first segment and next to the first convexity adjacent to the first segment.

The second reflective plate includes a second base and at least one second convexity. The second base includes a second lateral side and the second lateral side includes at least one second convexity extension. Each second convexity is extended from each corresponding second convexity extension. The length of each second convexity extension is shorter than the second lateral side, wherein the second lateral side except at least one second convexity extension forms at least one second segment. At least one second concavity is formed adjacent to each second segment and the second convexity next to the second segment. As the plurality of reflective plates is assemble to become the hollow integration rod, each second convexity is wedged with each corresponding first concavity, and then the structure of the hollow integration rod is fixed by a fixing component.

The advantages and the spirit of the present invention are further understood by the following description and drawings.

DESCRIPTION OF THE EMBODIMENTS

Figure 1:
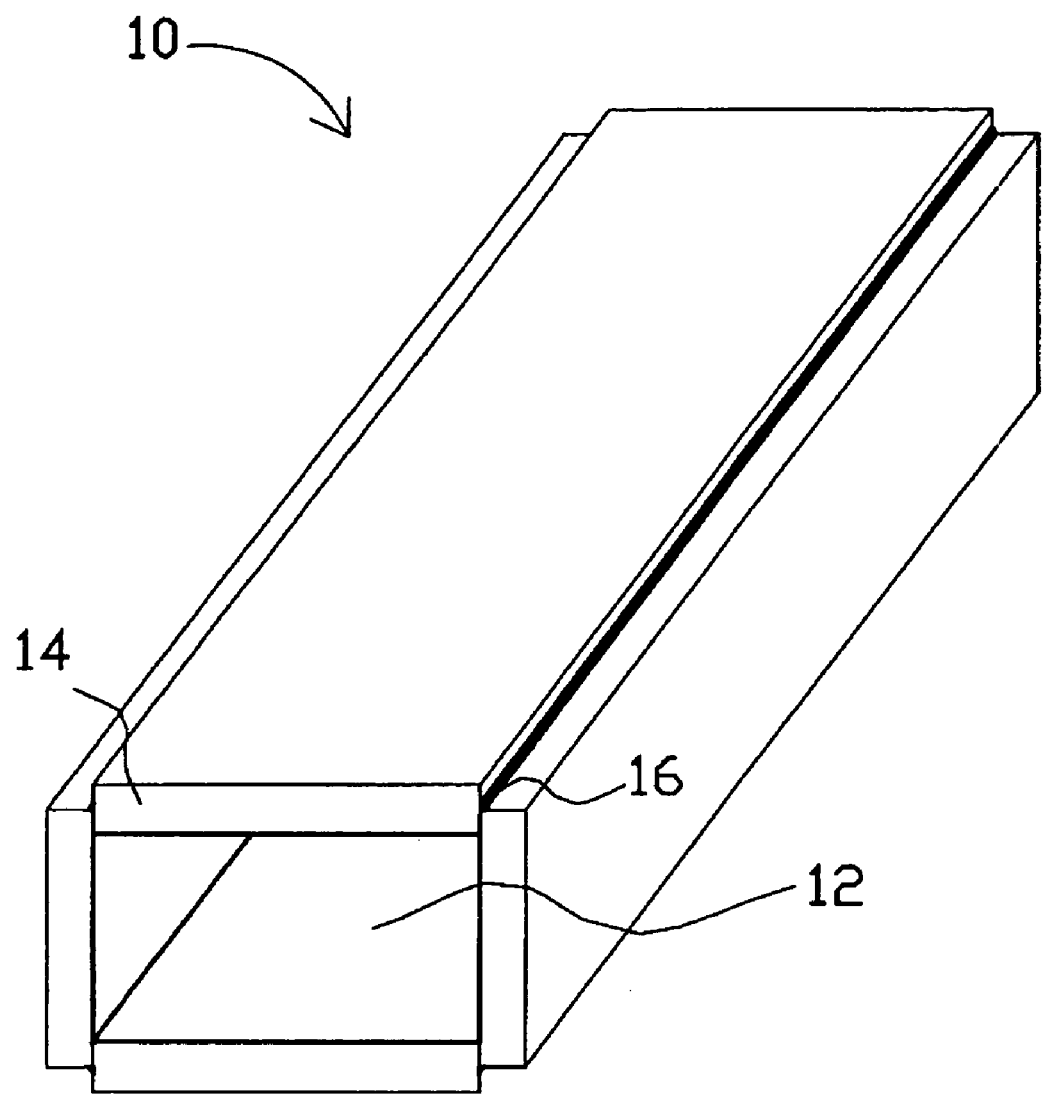
FIG. 1 is a perspective view showing a conventional integration rod.
Figure 2:
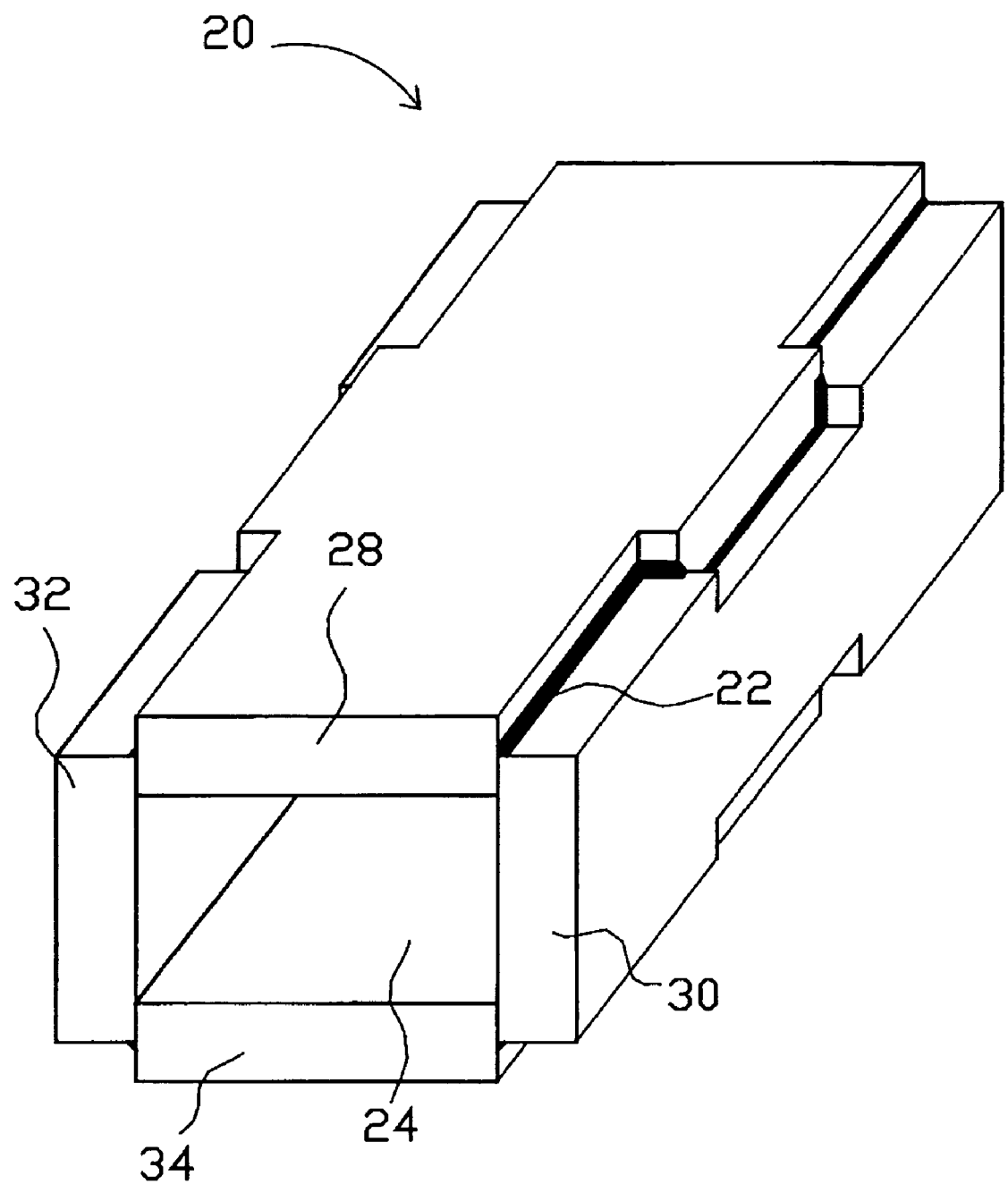
FIG. 2 is a perspective view showing the hollow integration rod of the first embodiment in the present invention.

Please refer to FIG. 2. The hollow integration rod 20 is composed of four reflective plates wedged to each other. The joint is fixed by glue 22. Each reflective plate includes a reflective surface 24 coated with a reflective layer. The four reflective surfaces 24 are all disposed inside the hollow space surrounded by the four reflective plates for forming a light tunnel.

Figure 3:
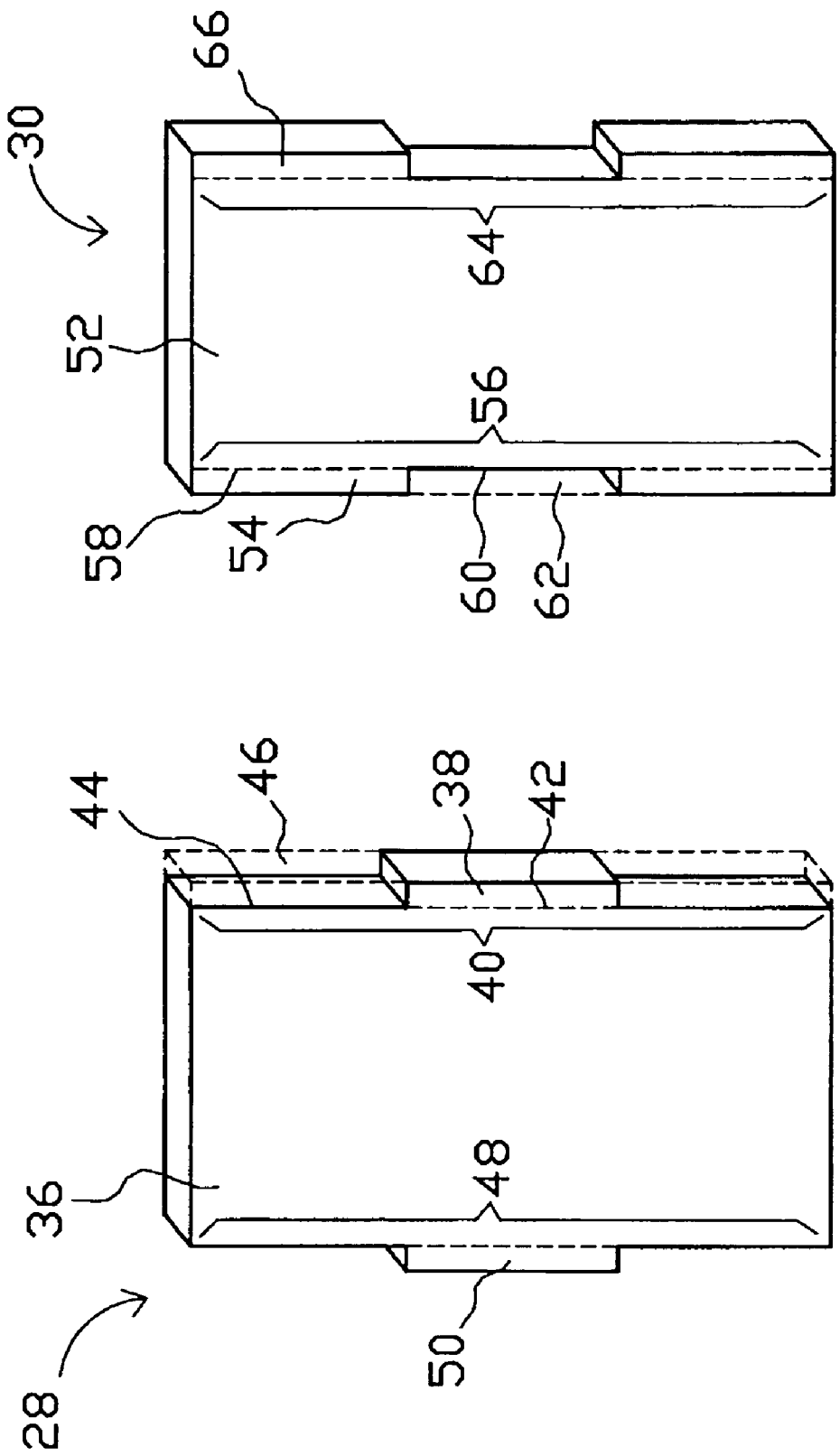
FIG. 3 is a perspective view showing the first reflective plate and the second reflective plate in FIG. 2.

Among the four reflective plates, the upper reflective plate is defined as the first reflective plate 28, the right reflective plate is defined as the second reflective plate 30, the left reflective plate is defined as the third reflective plate 32 and the lower reflective plate is defined as the fourth reflective plate 34. The first reflective plate 28 has the same shape as that of the fourth reflective plate 34, while the second reflective plate 30 has the same shape as that of the third reflective plate 32. Please refer to FIG. 3. The first reflective plate 28 includes a first base 36 and a first convexity 38, and the right lateral side of the first base 36 is defined as the first lateral side 40. The first lateral side 40 includes a first convexity extension 42 at about the middle thereof, and the length of the first convexity extension 42 is about one-third of that of the first lateral side 40. The first convexity 38 is extended from the first convexity extension 42 and the shape is rectangular. The first lateral side 40 except the first convexity extension 42 is formed two first segments 44, wherein two first concavities 46 are formed respectively next to the first segment 44 and next to the first convexity 38 that is adjacent to the first segment 44, and each first concavity 46 is rectangular.

The left side of the first base 36 is defined as a third lateral side 48. A third convexity 50 is extended from the third lateral side 48 and the shape thereof is the same as that of the first convexity 38, and besides, is disposed opposite to the first convexity 38.

The second reflective plate 30 includes a second base 52 and two second convexities 54. The left side of the second base 52 is defined as a second lateral side 56. Two second convexity extensions 58 are disposed at about two ends of the second lateral side 56. Each second convexity 54 is extended from the corresponding second convexity extensions 58 and the shape thereof is rectangular. Similar to each first concavity 46, a second segment 60 is formed the second lateral side 56 except the two second convexity extensions 58, wherein a second concavity 62 is formed next to the second segment 60 and next to the two second convexities 54 adjacent to the second segment 60, while the shape thereof is rectangular and similar to the first convexity 38.

The left side of the second base 52 is defined as a fourth lateral side 64. Two fourth convexities 66 are extended from the fourth lateral side 64 and the each shape thereof is the same as that of the second convexity 54, and besides, they are disposed opposite to the second convexity 54.

When four reflective plates are assembled to become the hollow integration rod 20, the first convexity 38 is wedged correspondingly to the second concavity 62, and each second convexity 54 is wedged correspondingly to each first concavity 46. Similarly, the third convexity 50 is wedged correspondingly to the third reflective plate 32, while each fourth convexity 66 is wedged correspondingly to the fourth reflective plate 34, and the third reflective plate 32 is also wedged correspondingly to the fourth reflective plate 34.

Figure 4:
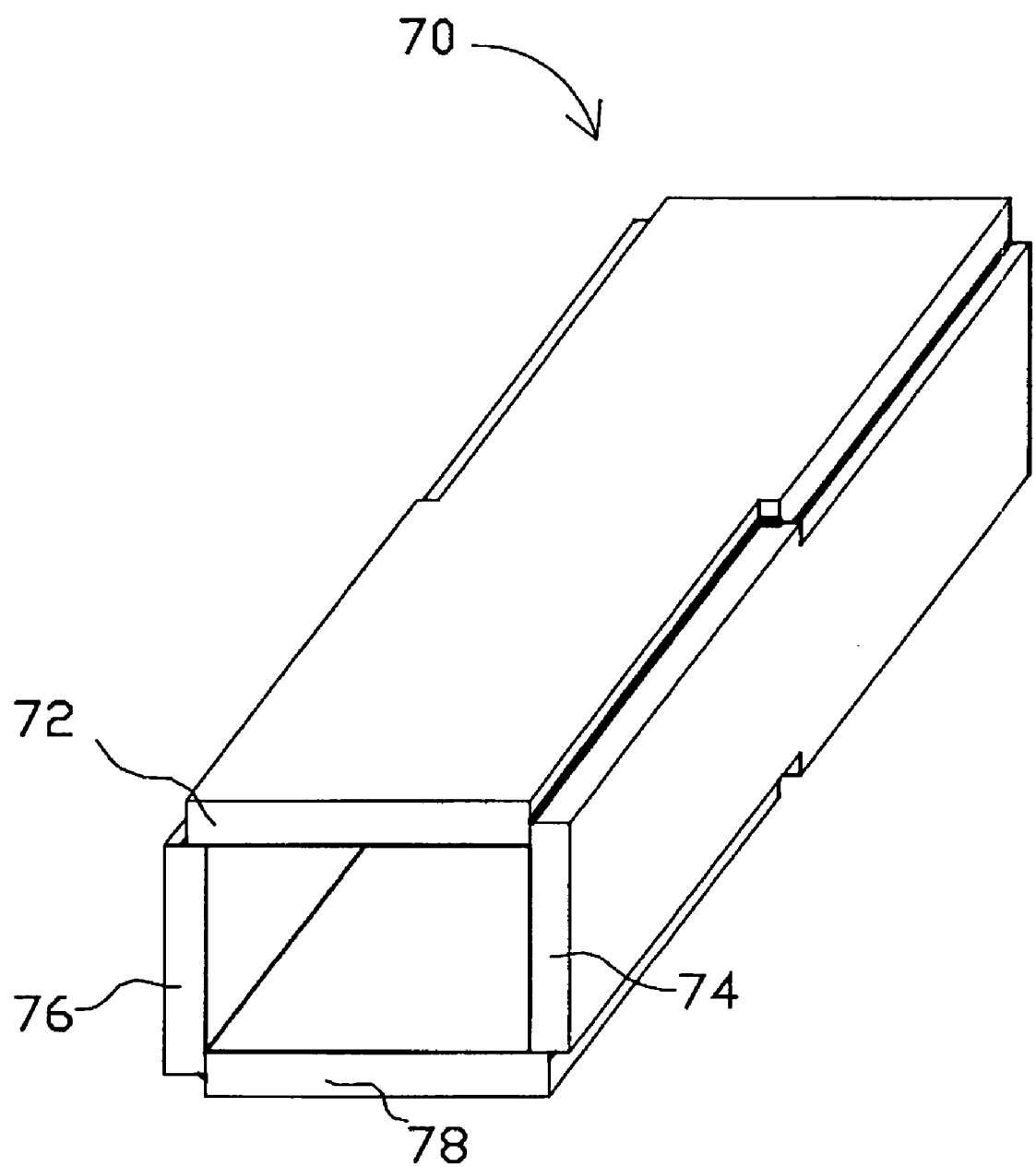
FIG. 4 is a perspective view showing the hollow integration rod of the second embodiment in the present invention.

Please refer to FIG. 4, which shows the hollow integration rod 70 of the second embodiment in the present invention. The second embodiment is mainly the same as the first embodiment, and only the shape of the reflective plates are different from the first embodiment. Thus, the following is to describe the shape of the reflective plates, while the same part is not described again.

In the second embodiment, the hollow integration rod 70 is composed of four reflective plates that each one is wedged with another. Among the four reflective plates, the upper reflective plate is defined as the first reflective plate 72, the right reflective plate is defined as the second reflective plate 74, the left reflective plate is defined as the third reflective plate 76 and the lower reflective plate is defined as the fourth reflective plate 78. The shape of the four reflective plates is the same, and therefore only the first reflective plate 72 is taken for illustration.

Figure 5:
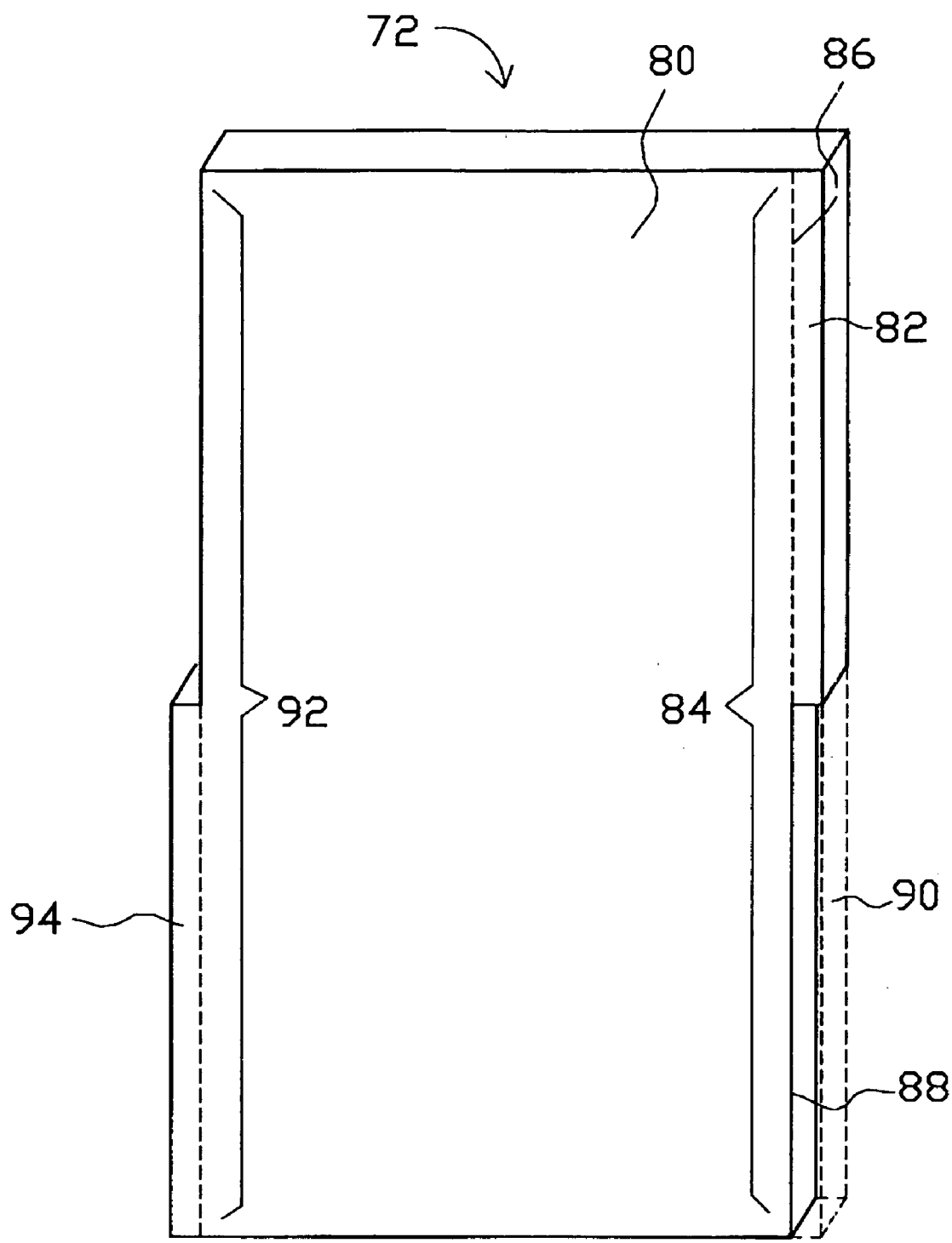
FIG. 5 is a perspective view showing the first reflective plate in FIG. 4.

Please refer to FIG. 5. The first reflective plate 72 includes a first base 80 and a first convexity 82. The right side of the first base 80 is defined as a first lateral side 84. A convexity extension 86 is disposed at about the upper half of the first lateral side 84 and the length thereof is about half of the first lateral side 84. The first convexity 82 is extended from the convexity extension 86 and the shape thereof is rectangular. A first segment 88 is formed on the first lateral side 84 except the convexity extension 86, wherein a first concavity 90 is formed next to the first segment 88 and next to the first convexity 82 that is adjacent to the first segment 88, and each first concavity 90 is rectangular.

The left side of the first base 80 is defined as a third lateral side 92. A third convexity 94 is extended from the third lateral side 92 and the shape thereof is the same as that of the first convexity 82, and besides, is disposed opposite to the first concavity 90.

Figure 6:
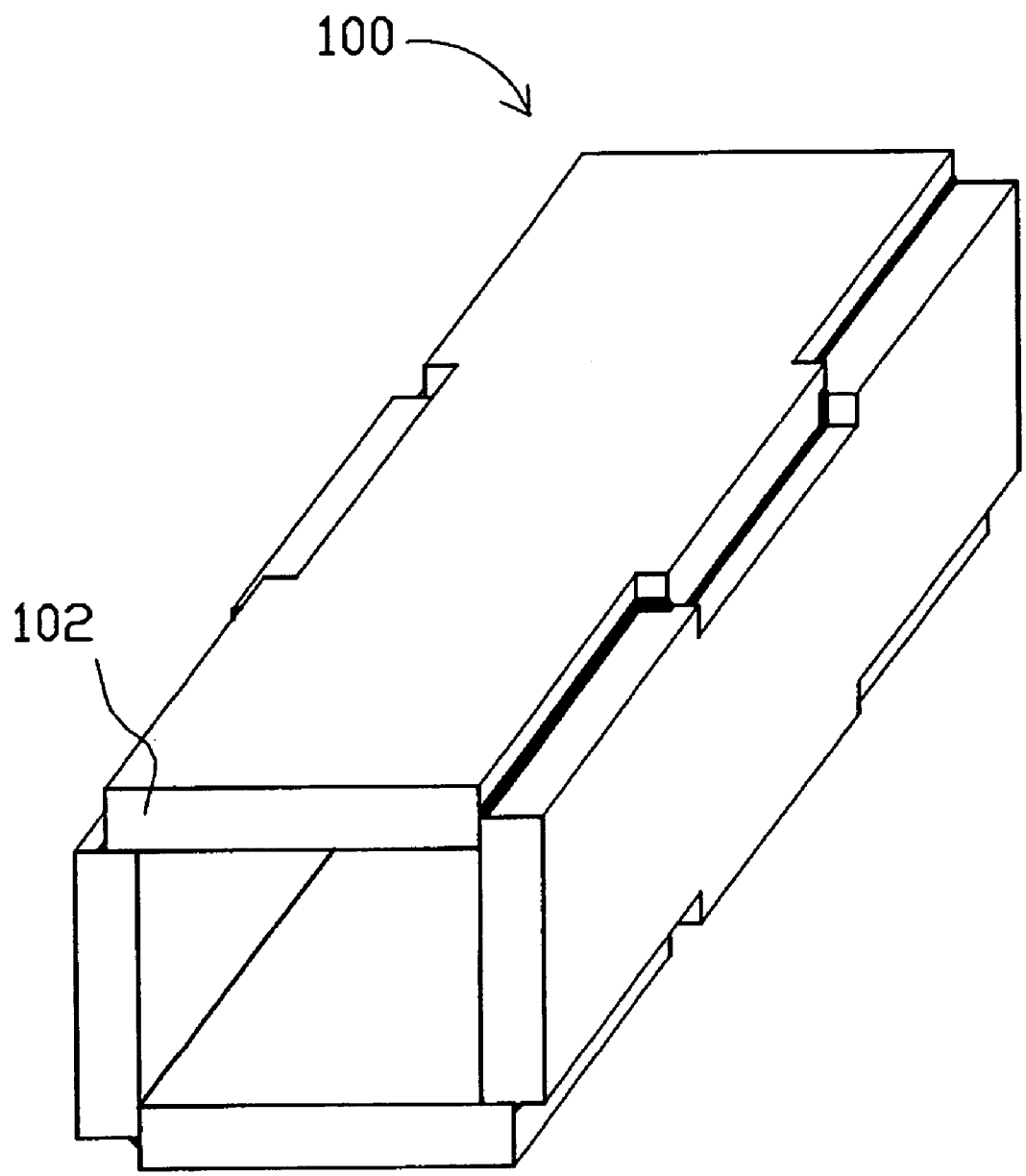
FIG. 6 is a perspective view showing the hollow integration rod of the third embodiment in the present invention.

Please refer to FIG. 6, which shows the hollow integration rod 100 of the third embodiment in the present invention. The third embodiment is mainly the same as the second embodiment, and only the shape of the reflective plates are different from the second embodiment. Thus, the following is to describe the shape of the reflective plates, while the same part is not described again.

In the third embodiment, the hollow integration rod 100 is composed of four reflective plates that each one is wedged with another. The shape of the four reflective plates is the same, and therefore only the first reflective plate 102 is taken for illustration.

Figure 7:
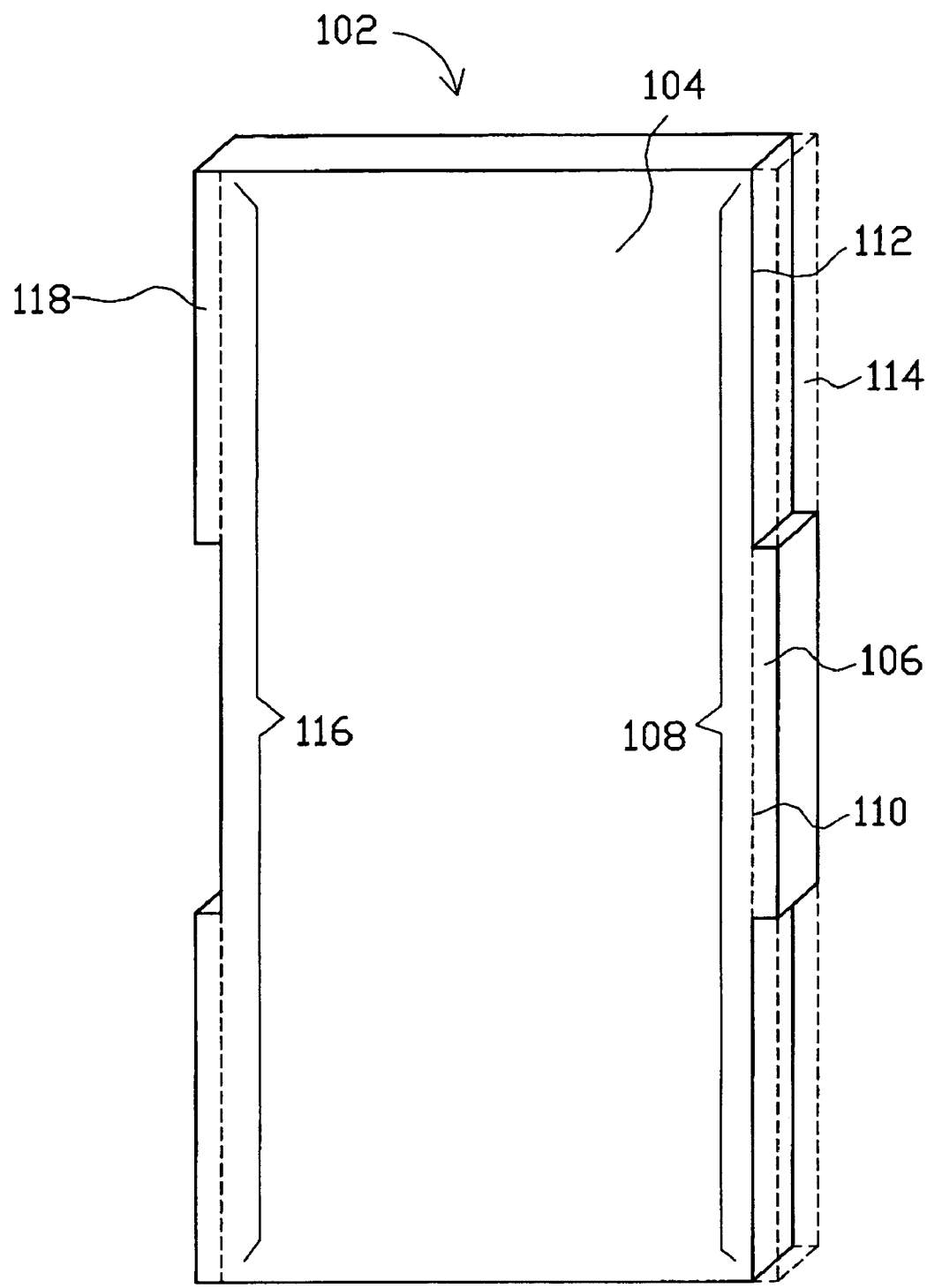
FIG. 7 is a perspective view showing the first reflective plate in FIG. 6.

Please refer to FIG. 7. The first reflective plate 102 includes a first base 104 and a first convexity 106. The right side of the first base 104 is defined as a first lateral side 108. A convexity extension 110 is disposed at about the middle of the first lateral side 108 and the length thereof is about one-third of the first lateral side 108. The first convexity 106 is extended from the convexity extension 110 and the shape thereof is rectangular. Two first segments 112 are formed on the first lateral side 108 except the convexity extension 110, wherein two first concavities 114 are formed next to the first segment 112 and next to the first convexity 106 that is adjacent to the first segment 112, and each first concavity 114 is rectangular.

The left side of the first base 104 is defined as a third lateral side 116. Two third convexities 118 are extended from the third lateral side 116 and the shape thereof is the same as that of the first convexity 106, and besides, they are disposed opposite to the first concavity 114.

In the fourth embodiment (not shown in the figures), each joint of the reflective plates in the hollow integration rods 20, 70 and 100 is not fixed by glue 22, but by applying the glue on the wedging surface. The combination structure of each reflective plate is the same as the first, the second and the third embodiments.

Figure 8:
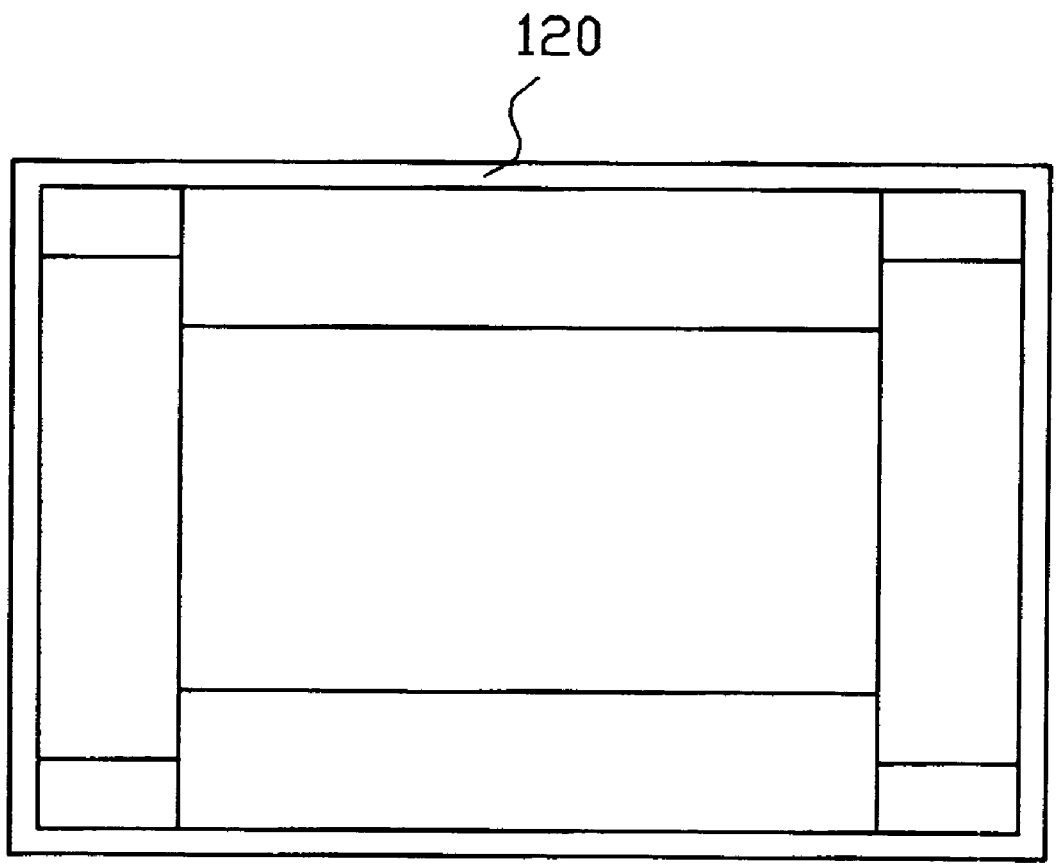
FIG. 8 is a perspective view showing the frame of the fifth embodiment in the present invention.

Please refer to FIG. 8. In the fifth embodiment, each joint of the reflective plates in the hollow integration rods 20, 70 and 100 is not fixed by glue 22, but by a frame 120 surrounding the hollow integration rods 20, 70 and 100 for fixing the combination structure of each reflective plate.

The first lateral side 40, 80 and 108 of the first reflective plate 28, 72 and 102 in the hollow integration rods 20, 70 and 100 are designed to have at least one first convexity 38, 82 and 106 and at least one concavity 46, 90 and 114 for wedging with one another. Similarly, at least one convexity and at least one concavity are disposed on each reflective plate of the hollow integration rods 20, 70 and 100. When the hollow integration rods 20, 70 and 100 are assembled, each reflective plate is wedged with another by corresponding convexity and concavity. Finally, each joint is fixed by glue 22, applying the glue on the wedging surface or a frame 120. Therefore, as the temperature of the hollow integration rods 20, 70 and 100 is too high that the glue 22 or the glue on the wedging surface is melt, the combination structure at each joint of each reflective plate do not collapse. In addition, because each convexity is rectangular, the combination structure is easy to practice without increasing too much cost.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A combination structure for a hollow integration rod, the combination structure being composed of a plurality of reflective plates for forming a light tunnel, the plurality of reflective plates comprising:

a first reflective plate, comprising:

a first base having a first lateral side, the first lateral side having at least one first convexity extension, the length of each first convexity extension being shorter than the first lateral side; and at least one first convexity extending from each corresponding first convexity extension, at least one first segment being formed on the first lateral side except the first convexity extension, at least one first concavity being formed next to each first segment and next to the first convexity adjacent to the first segment;

a second reflective plate, comprising:

a second base having a second lateral side, the second lateral side having at least one second convexity extension, the length of each second convexity extension being shorter than the second lateral side; and at least one second convexity extending from each corresponding convexity extension, at least one second segment being formed on the second lateral side except the second convexity extension, at least one second concavity being formed next to each second segment and next to the second convexity adjacent to the second segment;

wherein when the plurality of reflective plates is assembled to become the hollow integration rod, each first convexity is wedged correspondingly with each second concavity, and each second convexity is wedged correspondingly with each first concavity, and the combination structure for the hollow integration rod is fixed by a fixing component, and wherein the first base further comprises a third lateral side opposite to the first lateral side, and at least one third convexity is extended from the third lateral side, the number and the shape of the third convexity being the same as the number and the shape of the first convexity, the third convexity being disposed opposite to the first convexity, the third convexity being wedged with a third reflective plate included in the plurality of reflective plates.

2. The combination structure for a hollow integration rod according to claim 1, wherein the second base further comprises a fourth lateral side opposite to the second lateral side, and at least one fourth convexity is extended from the fourth lateral side, the number and the shape of the fourth convexity being the same as the number and the shape of the second convexity, the fourth convexity being disposed opposite to the second convexity, the fourth convexity being wedged with a fourth reflective plate included in the plurality of reflective plates.

* * * * *